United States Patent
Kolb et al.

(10) Patent No.: US 6,586,483 B2
(45) Date of Patent: Jul. 1, 2003

(54) FOAM INCLUDING SURFACE-MODIFIED NANOPARTICLES

(75) Inventors: Brant U. Kolb, Afton, MN (US); Jimmie R. Baran, Jr., Presscott, MN (US); Michael A. Johnson, Stillwater, MN (US); Gordon G. Johnson, Lake Elmo, MN (US); Megan P. Lehmann, St. Paul, MN (US); John S. Sokalski, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 79 days.

(21) Appl. No.: 09/756,422

(22) Filed: Jan. 8, 2001

(65) Prior Publication Data

US 2002/0128336 A1 Sep. 12, 2002

(51) Int. Cl.[7] .................................................. C08J 9/00
(52) U.S. Cl. ............................ 521/91; 521/92; 521/154
(58) Field of Search ............................ 521/91, 92, 154

(56) References Cited

U.S. PATENT DOCUMENTS

| | | | |
|---|---|---|---|
| 3,565,247 A | 2/1971 | Brochman | 206/59 |
| 3,755,211 A | 8/1973 | Fabris et al. | |
| 3,953,487 A | 4/1976 | Kratel et al. | 260/448.2 E |
| 4,367,293 A | 1/1983 | Shimizu | 521/122 |
| 4,415,615 A | 11/1983 | Esmay et al. | 428/40 |
| 4,710,536 A | 12/1987 | Klingen et al. | 524/493 |
| 4,715,986 A | 12/1987 | Grüning et al. | 252/315.2 |
| 4,844,980 A | 7/1989 | Grüning et al. | 482/405 |
| 4,954,327 A | 9/1990 | Blount | 423/338 |
| 5,360,829 A | 11/1994 | Kawabe et al. | 521/81 |
| 5,489,431 A | 2/1996 | Ascione et al. | |
| 5,643,557 A | 7/1997 | Eteve et al. | |
| 5,690,915 A | 11/1997 | Eteve et al. | |
| 5,690,917 A | 11/1997 | Eteve et al. | |
| 5,695,747 A | 12/1997 | Forestier et al. | |
| 5,788,955 A | 8/1998 | Eteve et al. | |
| 5,795,565 A | 8/1998 | Eteve et al. | |
| 6,090,439 A | 7/2000 | Menon et al. | 427/215 |

FOREIGN PATENT DOCUMENTS

| | | | |
|---|---|---|---|
| BE | 831573 | 7/1975 | |
| DE | 4419671 | 12/1995 | ........... B29C/67/20 |
| DE | 19610330 | 9/1997 | ............ C08J/9/228 |
| EP | 1 017 745 B1 | 5/2001 | |
| JP | 63 113035 | 5/1988 | .............. C08J/9/06 |
| WO | WO 98/05484 | 2/1998 | ........... B29C/44/20 |
| WO | WO 01/85324 A1 | 11/2001 | |

OTHER PUBLICATIONS

Kirk–Othmer, John Wiley & Sons, Encyclopedia of Chemical Technology, Fourth Edition, Vol. 21, Recycling, Oil to Silicon, "Amorphous Silica", pp., 1007–1032, 1997.

Garrett et al., "An experimental study of the antifoam behaviour of mixtures of a hydrocarbon oil and hydrophobic particles", *Colloids and Surfaces A: Physicochemical and Engineering Aspects*, 85, pp. 159–197, (1994).

Pugh, "Foaming, foam films, antifoaming and defoaming", *Advances in Colloid and Interface Science*, 65, pp. 67–142 (1996), Wang et al., "On the Role of Hydrophobic Particles and surfactants in Defoaming", *Langmuir*, 15, pp. 2202–2208 (1999).

"Cab–O–Sil ® Untreated Fumed Silica Properties and Functions", product literature (4 pages).

Zhang et al., U.S. Application Ser. No. 09/428,937, entitled "Dental Materials with Nano–Sized Silica Particles", filed Oct. 28, 1999.

Zhang et al., U.S. Application Ser. No. 09/429,185, entitled "Radiopaque Dental Materials with Nano–Sized Particles", filed Oct. 28, 1999.

Bennett et al., PCT Application No. PCT/US99/25276, entitled "Compositions and Articles Made Therefrom", filed Oct. 28, 1999.

Thunhorst et al., U.S. application Ser. No. 09/614,574, entitled "Foams Containing Functionalized Metal Oxide Nanoparticles and Methods of Making Same", filed Jul. 12, 2000.

*Primary Examiner*—Morton Foelak
(74) *Attorney, Agent, or Firm*—Scott A. Bardell

(57) ABSTRACT

A foam composition that includes a vehicle and surface-modified nanoparticles disposed in the vehicle. The individual nanoparticles having a particle diameter of less than about 100 nanometers.

63 Claims, No Drawings

FOAM INCLUDING SURFACE-MODIFIED NANOPARTICLES

BACKGROUND OF THE INVENTION

The invention relates to foaming compositions that include surface-modified nanoparticles.

Pure liquids generally cannot foam unless a surfactant is present in the liquid. The surfactant functions by lowering the surface tension of the liquid such that a gas bubble introduced below the surface of the liquid can be maintained in the liquid. The surfactants can also stabilize the foam after it is formed. Such surfactants include, e.g., ionic, nonionic and polymeric surfactants.

In some applications, surfactant may migrate to the surface of the composition, which may lead to undesirable consequences. In pressure sensitive adhesive compositions, for example, surfactants may affect the adhesive properties of the composition, and in medical applications the presence of surfactants at the surface of an article, e.g., a bandage, may lead to deleterious hygiene effects.

Inorganic particles are included in many foam compositions for a variety of reasons. Some of these particles function as nucleating agents. Other particles act as filler to alter the physical properties of the composition including, e.g., altering the rheology of the composition. Still other particles, hydrophobic fumed silica for example, have been found to function as defoaming agents. Fumed silica, which is also known as pyrogenic silica, consists of primary particles that are irreversibly bonded together in the form of aggregates, which have an average size of from 200 nm to 300 nm.

SUMMARY

In one aspect, the invention features a foam composition that includes a vehicle and surface-modified nanoparticles disposed in the vehicle, the individual nanoparticles having a particle diameter of less than about 100 nanometers. In one embodiment, the foam is essentially free of surfactant. In another embodiment, the foam composition further includes surfactant. In various embodiments, the foam composition includes at least about 0.5% by weight, at least about 1% by weight, at least about 2% by weight, at least about 5% by weight or at least about 10% by weight surface-modified nanoparticles.

In various embodiments, the individual nanoparticles have a particle diameter no greater than about 50 nanometers, from about 3 nanometers to about 50 nanometers, no greater than about 20 nanometers, from about 3 nanometers to about 20 nanometers and from about 3 nanometers to about 10 nanometers.

In one embodiment, the nanoparticles are selected from the group consisting of silica, titania, alumina, zirconia, vanadia, ceria, iron oxide, antimony oxide, tin oxide, aluminum/silica and combinations thereof.

In some embodiments, the nanoparticles include surface groups selected from the group consisting of hydrophobic groups, hydrophilic groups and combinations thereof. In other embodiments, the nanoparticles include surface groups derived from an agent selected from the group consisting of a silane, organic acid, organic base and combinations thereof. In other embodiments, the nanoparticles include organosilyl surface groups derived from an agent selected from the group consisting of alkylsilane, arylsilane, alkoxysilane, and combinations thereof.

In one embodiment, the nanoparticles include surface groups derived from an agent selected from the group consisting of carboxylic acid, sulfonic acid, phosphonic acid, and combinations thereof.

In some embodiments, the vehicle includes monomer, oligomer, polymer or a combination thereof. In other embodiments, the vehicle includes polymer selected from the group consisting of thermoplastic polymers, thermoset polymers, elastomers and mixtures thereof. In another embodiment, the vehicle includes a polymer selected from the group consisting of natural rubber, synthetic rubber, acrylonitrile-butadiene rubber, polyisoprene rubber, polychloroprene rubber, polybutadiene rubber, butyl rubber, ethylene-propylene-diene monomer rubber, ethylene-propylene rubber, styrene-butadiene copolymer, styrene-isoprene copolymer, styrene-butadiene-styrene rubber, styrene-isoprene-styrene rubber, styrene-ethylene-butylene-styrene rubber, styrene-ethylene-propylene-styrene rubber, polyisobutylene rubber, ethylene vinyl acetate rubber, silicone rubber, polyvinyl ethers and combinations thereof. In one embodiment, the vehicle includes a polymer selected from the group consisting of polyester, polyurethane, amino resin, alkyd resin, phenolic resin, epoxy resin, isocyanate resin, isocyanurate resin polysiloxane resin and mixtures thereof. In other embodiments, the vehicle includes a polymer selected from the group consisting of polyacrylonitrile, acrylonitrile-butadiene-styrene, styrene-acrylonitrile, cellulosic polymers, chlorinated polyether, ethylene vinyl acetate copolymers, polyamides, polyimides, polycarbonates, polyolefins, polyethylene terephthalate, polyphenylene oxides, polystyrene, polyurethanes, polyisocyanurates, polyvinyl chloride, polyvinyl acetate, polyvinyl alcohols, polyvinyl butyral, polyvinyl pyrrolidone, polyvinylidene chloride and mixtures thereof.

In one embodiment, the vehicle includes acrylic resin. In some embodiments, the acrylic resin includes acrylic or methacrylic acid ester of a monohydric alcohol having from 1 to 20 carbon atoms.

In some embodiments, the vehicle is nonpolymerizable. In other embodiments, the vehicle is essentially free of polymers. In one embodiment, the vehicle includes polyolefin. In some embodiments, the vehicle includes a metallocene polymerized polyolefin.

In other embodiments, the vehicle includes resin selected from the group consisting of novolac, resole and polyurea resins and mixtures thereof.

In one embodiment, the vehicle is selected from the group consisting of water, alcohols, aldehydes, ketones, esters, ethers, amines, amides, hydrocarbons, halocarbons and mixtures thereof.

In another embodiment, the foam composition further includes a foaming agent.

In one embodiment, the surface-modified nanoparticles include statistically averaged randomly surface-modified nanoparticles.

In one embodiment, the surface-modified nanoparticles include surface groups having a solubility parameter similar to the solubility parameter of the vehicle.

In one embodiment, the surface-modified nanoparticles appear to be dissolved in the vehicle.

In another embodiment, the vehicle includes an adhesive composition. In other embodiments, the vehicle includes a pressure sensitive adhesive composition. In one embodiment, the pressure sensitive adhesive composition includes acrylic resin. In some embodiments, the acrylic resin includes an acrylic or methacrylic acid ester of a monohydric alcohol having from 1 to 20 carbon atoms. In one embodiment, the pressure sensitive adhesive composition includes isooctyl acrylate and acrylic acid copolymer.

In another embodiment, the vehicle includes a hot melt adhesive composition.

In another aspect, the invention features an adhesive tape (e.g., a pressure sensitive adhesive tape) including an above-described foam composition. In other embodiments, the adhesive tape further includes a substrate and the foam composition is disposed on the substrate. In some embodiments, the foam composition includes an acrylic resin. In one embodiment, the acrylic resin includes acrylic or methacrylic acid ester of a monohydric alcohol having from 1 to 20 carbon atoms.

In another aspect, the invention features an article that includes an above-described foam composition. In one embodiment, the article is a gasket. In other embodiments, the article is automobile body molding.

In other aspects, the invention features a method of making a foam that includes introducing a foaming agent into a composition in an amount sufficient to form voids in the composition, where the composition includes a vehicle and surface-modified nanoparticles disposed in the vehicle and the surface-modified nanoparticles have a particle diameter of no greater than about 100 nanometers. In some embodiments, the step of introducing a foaming agent includes mechanically stirring the composition. In some embodiments, the step of introducing a foaming agent includes a chemical reaction of at least one component of the composition.

In one embodiment, the foaming agent is selected from the group consisting of liquid, gas, and solid foaming agents. In other embodiments, the foaming agent includes a gas selected from the group consisting of air, nitrogen, oxygen, carbon dioxide, helium, argon, nitrous oxide, and mixtures thereof. In other embodiments, the foaming agent includes the degradation product of a component of the vehicle.

In another aspect, the invention features a method of making a tape where the method includes substantially simultaneously a) foaming a composition that includes a vehicle and a plurality of surface-modified nanoparticles having an particle diameter of less than about 100 nanometers, and b) coating the composition on a substrate.

In one aspect, the invention features a method of determining the compatibility of a predetermined vehicle and surface-modified nanoparticles, where the method includes: a) selecting surface-modified nanoparticles, b) combining the surface-modified nanoparticles and the vehicle to form a composition, and c) introducing a foaming agent into the composition, wherein if the composition forms a persistent foam, the surface-modified nanoparticles are compatible with the vehicle.

In other aspects, the invention features a method of determining compatibility of a predetermined vehicle and surface-modified nanoparticles, where the method includes a) selecting surface-modified nanoparticles; and b) combining the surface-modified nanoparticles and the vehicle to form a composition, wherein, if the surface-modified nanoparticles appear to dissolve in the vehicle, the surface-modified nanoparticles are compatible with the vehicle.

In some aspects, the invention features a method for selecting compatible surface-modified nanoparticles for a predetermined vehicle, and the method includes selecting surface-modified nanoparticles that have a particle diameter of less than about 100 nanometers and that include attached surface groups that have a solubility parameter substantially similar to the solubility parameter of the predetermined vehicle, dispersing the surface-modified nanoparticles in a vehicle, and foaming the vehicle, wherein the presence of a persistent foam indicates that the surface-modified nanoparticles are compatible with the vehicle.

In another aspect, the invention features a method of foaming a composition that includes a) adding surface-modified nanoparticles identified by an above-described method to a predetermined vehicle, and b) foaming the vehicle.

The term "surface-modified nanoparticle" refers to a particle that includes surface groups attached to the surface of the particle. The surface groups modify the character of the particle.

The term "persistent foam" refers to the presence of gas voids in a composition for a period greater than 1 minute after the composition has been foamed.

The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate.

The inventors have discovered that compositions that include surface-modified nanoparticles are capable of forming a persistent foam. These compositions surprisingly are capable of forming a persistent foam in the absence of a surfactant. The invention has broad application due to the wide variety of compositions that can be foamed once appropriate surface-modified nanoparticles are dispersed throughout the composition.

The surface-modified nanoparticle containing compositions can also be formulated to provide improved foaming, e.g., an increased number of voids, more uniformly dimensioned voids, and combinations thereof, relative to the composition without surface-modified nanoparticles.

The foam compositions can also be formulated to be free of volatile organic compounds and flammable solvents.

Other features of the invention will be apparent from the following description of preferred embodiments thereof, and from the claims.

DETAILED DESCRIPTION OF THE PREFERRED EMBODIMENTS

The foam composition includes surface-modified nanoparticles, e.g., inorganic nanoparticles, having a particle diameter of less than 100 nanometers, disposed in a vehicle. The foam composition includes gas voids, i.e., bubbles, which may be present at the surface of the composition, dispersed throughout the composition, or a combination thereof. For some applications, the gas voids are dispersed uniformly throughout the composition. The foam is persistent and preferably includes a cellular structure in which the gas voids are in the form of closed cells.

The surface-modified nanoparticles are preferably individual, unassociated (i.e., non-aggregated) nanoparticles dispersed throughout the vehicle and preferably do not irreversibly associate with each other. The term "associate with" or "associating with" includes, for example, covalent bonding, hydrogen bonding, electrostatic attraction, London forces, and hydrophobic interactions.

The surface-modified nanoparticles are selected such that the composition formed therewith is free from a degree of particle agglomeration or aggregation that would interfere with the desired properties of the composition including the ability of the composition to foam. The surface-modified nanoparticles are selected to be compatible with the vehicle to be foamed. For vehicles that include a variety of components, the surface-modified nanoparticles may be selected to be compatible with at least one component of the vehicle.

The surface-modified nanoparticles have surface groups that modify the solubility characteristics of the nanoparticles. The surface groups are selected to render the particle compatible with the vehicle including, e.g., a component of the vehicle, in which the particle is disposed such that the resulting composition, upon foaming, forms a persistent foam. When the composition is polymerizable, for example, the surface groups can be selected to associate or react with at least one component of the vehicle to become part of the polymer network of the composition.

One method of assessing the compatibility of the surface-modified nanoparticles with the vehicle includes determining whether the resulting composition forms a persistent foam when a foaming agent is introduced into the composition. For transparent vehicles, one useful method of assessing the compatibility of the surface-modified nanoparticles with the transparent vehicle includes combining the surface-modified nanoparticles and the vehicle and observing whether the surface-modified nanoparticles appear to dissolve in the vehicle such that the resulting composition is transparent. The nature of the inorganic particle component of the surface-modified particle will prevent the surface-modified particle from actually dissolving in the vehicle, i.e., the surface-modified nanoparticles will be dispersed in the vehicle, however the compatibility of the surface groups with the vehicle will give the surface-modified nanoparticles the appearance of dissolving in the vehicle. As the size of the surface-modified nanoparticles increases, the haziness of the vehicle generally increases. Preferred surface-modified nanoparticles are selected such that they do not settle out of the vehicle. The further step in assessing the compatibility of the vehicle and the surface-modified nanoparticles includes determining whether, upon subsequent introduction of a foaming agent, the composition foams.

Suitable surface groups can also be selected based upon the solubility parameter of the surface group and the vehicle. Preferably the surface group, or the agent from which the surface group is derived, has a solubility parameter similar to the solubility parameter of the vehicle to be foamed. When the vehicle to be foamed is hydrophobic, for example, one skilled in the art can select from among various hydrophobic surface groups to achieve a surface-modified particle that is compatible with the hydrophobic vehicle. Similarly, when the vehicle to be foamed is hydrophilic, one skilled in the art can select from hydrophilic surface groups and, when the vehicle to be foamed is a fluorocarbon, one skilled in the art can select from among various fluorocarbon surface groups. The particle can also include at least two different surface groups that combine to provide a particle having a solubility parameter that is similar to the solubility parameter of the vehicle.

The surface groups may be selected to provide a statistically averaged, randomly surface-modified particle.

The surface groups are present on the surface of the particle in an amount sufficient to provide surface-modified nanoparticles that are capable of being subsequently dispersed in the vehicle without aggregation. The surface groups preferably are present in an amount sufficient to form a monolayer, preferably a continuous monolayer, on the surface of the particle.

Surface modifying groups may be derived from surface modifying agents. Schematically, surface modifying agents can be represented by the formula A-B, where the A group is capable of attaching to the surface of the particle and the B group is a compatibilizing group that may be reactive or non-reactive with a component of the composition. Compatibilizing groups can be selected to render the particle relatively more polar, relatively less polar or relatively non-polar.

Suitable classes of surface-modifying agents include, e.g., silanes, organic acids organic bases and alcohols.

Particularly useful surface-modifying agents include silanes. Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris (isobutoxy) silane, vinyltris(isopropenoxy)silane and vinyltris(2-methoxyethoxy)silane; trialkoxyarylsilanes; isooctyltrimethoxy-silane; N-(3-triethoxysilylpropyl) methoxyethoxyethoxy ethyl carbamate; N-(3-triethoxysilylpropyl) methoxyethoxyethoxyethyl carbamate; silane functional (meth)acrylates including, e.g., 3-(methacryloyloxy)propyltrimethoxysilane, 3-acryloyloxypropyltrimethoxysilane, 3-(methacryloyloxy) propyltriethoxysilane, 3-(methacryloyloxy) propylmethyldimethoxysilane, 3-(acryloyloxypropyl) methyldimethoxysilane, 3-(methacryloyloxy) propyldimethylethoxysilane, 3-(methacryloyloxy) methyltriethoxysilane, 3-(methacryloyloxy) methyltrimethoxysilane, 3-(methacryloyloxy) propyldimethylethoxysilane, 3-(methacryloyloxy) propenyltrimethoxysilane and 3-(methacryloyloxy) propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Methods of surface-modifying silica using silane functional (meth)acrylates are described, e.g., in U.S. Pat. Nos. 4,491,508 and 4,455,205 (Olsen et al.); U.S. Pat. Nos. 4,478,876 and 4,486,504 (Chung) and U.S. Pat. No. 5,258,225 (Katsamberis), and incorporated herein.

Useful organic acid surface-modifying agents include, e.g., oxyacids of carbon (e.g., carboxylic acid), sulfur and phosphorus, and combinations thereof.

Representative examples of polar surface-modifying agents having carboxylic acid functionality include $CH_3O$ $(CH_2CH_2O)_2CH_2COOH$ (hereafter MEEAA) and 2-(2-methoxyethoxy)acetic acid having the chemical structure $CH_3O$ $CH_2CH_2O$ $CH_2COOH$ (hereafter MEAA) and mono (polyethylene glycol) succinate.

Representative examples of non-polar surface-modifying agents having carboxylic acid functionality include octanoic acid, dodecanoic acid and oleic acid.

Examples of suitable phosphorus containing acids include phosphonic acids including, e.g., octylphosphonic acid, laurylphosphonic acid, decylphosphonic acid, dodecylphosphonic acid and octadecylphosphonic acid.

Useful organic base surface-modifying agents include, e.g., alkylamines including, e.g., octylamine, decylamine, dodecylamine and octadecylamine.

Examples of other useful non-silane surface modifying agents include acrylic acid, methacrylic acid, beta-carboxyethyl acrylate, mono-2-(methacryloyloxyethyl) succinate, and combinations thereof A useful surface modifying agent that imparts both polar character and reactivity to the nanoparticles is mono(methacryloyloxypolyethyleneglycol) succinate.

Examples of suitable surface-modifying alcohols include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof When the vehicle includes aromatic ring containing epoxy resins, useful surface-modifying groups can include an aromatic ring. Examples of surface-modifying groups particularly suitable for epoxy resin compositions are disclosed in U.S. Pat. No. 5,648,407 (Goetz et al.) and incorporated herein.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. Nos. 2,801,185 (Iler) and 4,522,958 (Das et al.), and incorporated herein.

Preferably the nanoparticles are inorganic. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles have an average particle diameter less than about 100 nm, preferably no greater than about 50 nm, more preferably from about 3 nm to about 50 nm, even more preferably from about 3 nm to about 20 nm, most preferably from about 5 nm to about 10 nm. If the nanoparticles are aggregated, the maximum cross sectional dimension of the aggregated particle is within any of these preferable ranges.

Useful surface-modified zirconia nanoparticles include a combination of oleic acid and acrylic acid adsorbed onto the surface of the particle.

Useful surface-modified silica nanoparticles include silica nanoparticles surface-modified with silane surface modifying agents including, e.g., acryloyloxypropyl trimethoxysilane, 3-methacryloyloxypropyl-trimethoxysilane, 3-mercaptopropyltrimethoxysilane, n-octyltrimethoxysilane, isooctyltrimethoxysilane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl)silanes, and combinations thereof and organotitanates and mixtures thereof.

The nanoparticles may be in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.

Useful metal oxide colloidal dispersions include colloidal zirconium oxide, suitable examples of which are described in U.S. Pat. No. 5,037,579 and incorporated herein, and colloidal titanium oxide, useful examples of which are described in PCT Publication No. WO 00/06495 entitled, "Nanosize Metal Oxide Particles for Producing Transparent Metal Oxide Colloids and Ceramers," (Arney et al.) filed Jul. 30, 1998, and incorporated herein.

Various methods may be employed to combine the surface-modified nanoparticles and the vehicle. In one method, a colloidal dispersion of surface-modified nanoparticles and vehicle are combined. Solvent present in the composition is then removed, leaving the surface-modified nanoparticdes dispersed in the vehicle. The solvent may be removed by evaporation including, e.g., distillation, rotary evaporation or oven drying. Optionally, for some colloidal dispersions, e.g., aqueous colloidal dispersions, prior to addition of the vehicle, a cosolvent (e.g., methoxy-2-propanol or N-methylpyrrolidone) may be added to the colloidal dispersion to assist removal of water. After the vehicle is added, the water and cosolvent are removed.

Another method for incorporating colloidal dispersions of surface-modified nanoparticles into a vehicle includes drying the colloidal dispersion of surface-modified nanoparticles to a powder, followed by addition of the vehicle or at least one component of the vehicle into which the nanoparticles are to be dispersed. The drying step may be accomplished by conventional means such as oven drying or spray drying. The surface-modified nanoparticles preferably have a sufficient amount of surface groups to prevent irreversible agglomeration or irreversible aggregation upon drying. The drying time and the drying temperature is preferably minimized for nanoparticles having less than 100% surface coverage.

Colloidal dispersions of surface-modified nanoparticles can be added to the vehicle in amounts sufficient to provide a composition capable of foaming, preferably in amounts sufficient to provide a composition capable of forming a persistent foam. Surface-modified nanoparticles may be present in the composition in varying amounts including, e.g., from about 0.1% by dry weight to about 70 % by dry weight, preferably from about 0.5% by dry weight to about 30 % by dry weight, more preferably from about 0.8% by dry weight to about, 30 % by dry weight, more preferably from about 1% by dry weight to about 10% by dry weight, most preferably from about 2% by dry weight to about 10% by dry weight, based on the total weight of the composition. The surface-modified nanoparticles are preferably dispersed throughout the vehicle, more preferably dispersed homogeneously throughout the vehicle.

A cosolvent can be added to the composition to improve the compatibility (e.g., solubility or miscibility) of the surface modifying agent and the surface-modified particles with the other components of the composition.

The vehicle of the foam composition can include a variety of components and may be in the form of a solid, liquid and mixtures thereof. Prior to foaming, the vehicle is preferably a liquid including, e.g., solution, emulsion, suspension, dispersion, syrup and melt. The vehicle is selected based upon the desired properties of the foam composition including, e.g., tack, stiffness, hardness, density, volume, transparency, flexibility, conformability, resilience, creep, strength modulus elongation, chemical resistance, temperature resistance, environmental resistance and compressibility.

Example vehicles include inorganic liquids such as water and organic liquids including, e.g., acids, alcohols, ketones, aldehydes, amines, ethers, hydrocarbons, halocarbons, monomers, oligomers, and polymers.

Examples of useful organic vehicles include natural and synthetic rubber resins including thermosettable rubbers as well as thermoplastic rubbers and elastomers including, e.g., nitrile rubbers (e.g., acrylonitrile-butadiene), polyisoprene rubber, polychloroprene rubber, polybutadiene rubber, butyl rubber, ethylene-propylene-diene monomer rubbers (EPDM), Santoprene® polypropylene-EPDM elastomers, ethylene-propylene rubber, styrene-butadiene copolymers, styrene-isoprene copolymers, styrene-butadiene-styrene rubber, styrene-isoprene-styrene rubber, styrene-ethylene-butylene-styrene rubber, styrene-ethylene-propylene-styrene rubber, polyisobutylene rubber, ethylene vinyl acetate rubbers, silicone rubbers including, e.g., polysiloxanes, methacrylate rubbers, polyacrylate rubbers including, e.g., copolymers of isooctyl acrylate and acrylic acid, polyesters, polyether esters, polyvinyl ethers, polyurethanes and blends and combinations thereof, including e.g., linear, radial, star and tapered block copolymers thereof.

Other useful elastomers include, e.g., fluoroelastomers including, e.g., polytrifluoroethylene, polyvinylidene fluoride, hexafluoropropylene and fluorinated ethylene-propylene copolymers, fluorosilicones and chloroelastomers including, e.g., chlorinated polyethylene, and combinations thereof.

Examples of useful thermoplastic resins include polyacrylonitrile, acrylonitrile-butadiene-styrene, styrene-acrylonitrile, cellulose, chlorinated polyether, ethylenevinylacetate, fluorocarbons including, e.g., polychlorotrifluoroethylene, polytetrafluoroeythylene, fluorinated ethylene-propylene and polyvinylidene fluoride, polyamides including, e.g., polycaprolactam, polyhexamethylene adipamide, polyhexamethylene sebacamide, polyundecanoamide, polylauroamide and polyacrylamide, polyimides including, e.g., polyetherimide, polycarbonate, polyolefins including, e.g., polyethylene, polypropylene, polybutene and poly-4-methyl pentene, polyalkylene terephthalates including e.g., polyethyleneterephthalate, polyalkylene oxides including, e.g., polyphenylene oxide, polystyrene, polyurethane, polyisocyanurates, vinyl polymers including, e.g., polyvinyl chloride, polyvinyl acetate, polyvinyl alcohol, polyvinyl butyral, polyvinylpyrrolidone, polyvinylidene chloride and combinations thereof.

Useful thermosettable resins include e.g., polyesters and polyurethanes and hybrids and copolymers thereof including, e.g., acylated urethanes and acylated polyesters, amino resins (e.g., aminoplast resins) including, e.g., alkylated urea-formaldehyde resins, melamine-formaldehyde resin, acrylate resins including, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones, alkyd resins such as urethane alkyd resins, polyester resins, reactive urethane resins, phenolic resins including, e.g., resole resins, novolac resins and phenol-formaldehyde resins, phenolic/latex resins, epoxy resins including, e.g., bisphenol epoxy resins, aliphatic and cycloaliphatic epoxy resins, epoxy/urethane resin, epoxy/acrylate resin and epoxy/silicone resin, isocyanate resins, isocyanurate resins, polysiloxane resins including alkylalkoxysilane resins, reactive vinyl resins and mixtures thereof.

The vehicle may be selected to provide an adhesive composition including, e.g., pressure sensitive, hot melt, thermoset and thermoplastic adhesive compositions. The vehicle can include any pressure-sensitive adhesive composition including, e.g., solvent-coatable, hot-melt-coatable, radiation-curable (E-beam, actinic including, e.g., visible and UV, and thermal), water-based emulsion type adhesives and combinations thereof. Suitable pressure sensitive adhesive compositions include, e.g., tackified rubber adhesives, e.g., natural rubber, olefins, silicones, polyisoprenes, polybutadiene, polyurethanes, styrene-isoprene-styrene and styrene-butadiene-styrene block copolymers and other elastomers, and tackified and untackified acrylic adhesive compositions including copolymers of isooctyl acrylate and acrylic acid.

Acrylate pressure sensitive adhesives are well known in the art. Many of these adhesives are copolymers of an alkyl ester of acrylic acid and, optionally, a minor portion of a co-monomer. Useflul acrylic acid esters include acrylic or methacrylic acid esters of a monohydric alcohol having from 1 to 20 carbon atoms including, e.g., isooctyl acrylate, 2-ethylhexyl acrylate, isononyl acrylate, isodecyl acrylate, decyl acrylate, dodecyl acrylate, lauryl acrylate, hexyl acrylate, butyl acrylate, and octadecyl acrylate and combinations thereof. Other useful monomers for acrylate-based adhesive compositions include ethylenically-unsaturated monomers including, e.g., cyclohexyl acrylate, isobornyl acrylate, N-octyl acrylamide, t-butyl acrylate, methyl methacrylate, ethyl methacrylate and propyl methacrylate and combinations thereof Other useful ethylenically unsaturated monomers include, e.g., acrylic acid, methacrylic acid, itaconic acid, substituted acrylamides including, e.g., N,N-dimethylacrylamide, N-vinyl-2-pyrrolidone, N-vinyl caprolactam, acrylonitrile, tetrahydrofurfuryl acrylate, glycidyl acrylate, 2-phenoxyethyl acrylate and benzyl acrylate, and combinations thereof.

The vehicle can also include other ingredients including, e.g., initiators, curing agents, cure accelerators, catalysts, crosslinking agents, tackifiers, plasticizers, dyes, flame retardants, coupling agents, pigments, impact modifiers, flow control agents, foaming agents, fillers, glass and polymer microspheres and microparticles, other particles including electrically conductive particles, thermally conductive particles, fibers, antistatic agents, antioxidants and UV absorbers.

Where the vehicle includes monomers, polymerization can be achieved by various conventional free radical polymerization methods, which can be chemical or radiation initiated, including, e.g., solvent polymerization, emulsion polymerization, suspension polymerization, bulk polymerization and radiation polymerization including, e.g., processes using actinic radiation including, e.g., visible and ultraviolet light, electron beam radiation and combinations thereof.

Useful free radical initiators include thermal and photoactive initiators. The type of initiator used depends on the polymerization process. Examples of photoinitiators include benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone.

The vehicle can also include copolymeric photoinitiators including, e.g., 2-[4-(2-hydroxy-2-methylpropenoyl) phenoxy]ethyl-2-methyl-2-N-propenoylamino propanoate and the polymerizable photoinitiator available under the trade designation DAROCUR ZLJ 3331 from Ciba-Geigy, and photoacid generated initiators including, e.g., diarylidoniumhexafluoroantimonate available under the trade designation SarCat CD-1012 from Sartomer (Exton, Pa.) and triarylsulfonium hexafluorophosphate available under the trade designation SarCat CD-101 1 (Sartomer).

Examples of suitable thermal initiators include peroxides such as benzoyl peroxide, dibenzoyl peroxide, dilauryl peroxide, cyclohexane peroxide, methyl ethyl ketone peroxide, hydroperoxides including, e.g., butyl hydroperoxide and cumene hydroperoxide, dicyclohexyl peroxydicarbonate, t-butyl perbenzoate, and azo compounds, for example, 2,2,-azo-bis(isobutyronitrile) (AIBN) and combinations thereof. Examples of commercially available thermal initiators include initiators available under the "VAZO" trade designation from DuPont Specialty Chemical (Wilmington, Del.) including VAZO 64 (2,2'-azobis(isobutyronitrile)), VAZO 52, VAZO 65 and VAZO 68, as well as thermal initiators available under the trade designation "Lucidol" from Elf Atochem North America, (Philadelphia, Pa.), and initiators available under the Celogen trade designation from Uniroyal Chemical Co. (Middlebury, Conn.).

An initiator is used in an amount effective to facilitate polymerization of the monomers present in the composition and the amount will vary depending upon, for example, the type of initiator, the molecular weight of the initiator, the intended application of the resulting adhesive composition and the polymerization process including, e.g., the temperature of the process.

The composition may be cross-linked to alter the properties of the composition. Cross-linking can be achieved with or without a cross-linking agent by using high energy radiation such as gamma or electron beam radiation. A cross-linking agent or a combination of cross-linking agents can be added to the mixture of polymerizable monomers to facilitate cross-linking.

Useful radiation curing cross-linking agents include multifunctional acrylates, such as those disclosed in U.S. Pat. No. 4,379,201 (Heilmann et al.), which include 1,6-hexanediol diacrylate, trimethylolpropane triacrylate, 1,2-ethylene glycol diacrylate, pentaerythritol tetraacrylate, 1,12-dodecanol diacrylate, and combinations thereof, and copolymerizable aromatic ketone co-monomers such as those disclosed in U.S. Pat. No 4,737,559 (Kellen et al.), and incorporated herein. Suitable ultraviolet light sources include, e.g., medium pressure mercury lamps and ultraviolet black light.

A polymerizable monomer composition may also include a chain transfer agent. The chain transfer agent is preferably soluble in the monomer mixture prior to polymerization. Examples of suitable chain transfer agents include triethyl silane and mercaptans.

The composition is preferably foamed after the surface-modified nanoparticles have become dispersed throughout the vehicle, more preferably after the surface-modified nanoparticles are homogeneously dispersed throughout the vehicle. The composition can be foamed according to a variety of foaming methods including those described in, e.g., U.S. Pat. Nos. 5,024,880, 4,895,745 and 4,748,061 (Vesley et al.).

The composition is foamed by forming gas voids in the composition using a variety of mechanisms including, e.g., mechanical mechanisms, chemical mechanisms, and combinations thereof.

Useful mechanical foaming mechanisms include, e.g., agitating, e.g., shaking, stirring, or whipping the composition and combinations thereof, injecting gas into the composition, e.g., inserting a nozzle beneath the surface of the composition and blowing gas into the composition, and combinations thereof.

Useful chemical foaming mechanisms include, e.g., producing gas in situ through a chemical reaction, decomposition of a component of the composition including, e.g., a component that liberates gas upon thermal decomposition, evaporating a component of the composition including, e.g., a liquid gas, volatilizing a gas in the composition by decreasing the pressure on the composition or heating the composition, and combinations thereof.

In principle, any foaming agent may be used to foam the composition including, e.g., chemical foaming agents and physical foaming agents including, e.g., inorganic and organic foaming agents.

Examples of chemical foaming agents include water and azo-, carbonate- and hydrazide-based molecules including, e.g., 4,4'-oxybis (benzenesulfonyl)hydrazide, 4,4'-oxybenzenesulfonyl semicarbazide, azodicarbonamide, p-toluenesulfonyl semicarbazide, barium azodicarboxylate, azodiisobutyronitrile, benzenesulfonhydrazide, trihydrazinotriazine, metal salts of azodicarboxylic acids, oxalic acid hydrazide, hydrazocarboxylates, diphenyloxide-4,4'-disulphohydrazide, tetrazole compounds, sodium bicarbonate, ammonium bicarbonate, preparations of carbonate compounds and polycarbonic acids, and mixtures of citric acid and sodium bicarbonate, N,N'-dimethyl-N,N'-dinitroso-terephthalamide, N,N'-dinitroso-pentamethylenetetramine, and combinations thereof.

Suitable inorganic physical foaming agents include, e.g., nitrogen, argon, oxygen, water, air, helium, sulfur hexafluoride and combinations thereof.

Useful organic physical foaming agents include carbon dioxide, aliphatic hydrocarbons, aliphatic alcohols, fully and partially halogenated aliphatic hydrocarbons including, e.g., methylene chloride, and combinations thereof Examples of suitable aliphatic hydrocarbon foaming agents include members of the alkane series of hydrocarbons including, e.g., methane, ethane, propane, n-butane, isobutane, n-pentane, isopentane and blends thereof Useful aliphatic alcohols include, e.g., methanol, ethanol, n-propanol, and isopropanol and combinations thereof Suitable fully and partially halogenated aliphatic hydrocarbons include, e.g., fluorocarbons, chlorocarbons, and chlorofluorocarbons and combinations thereof.

Examples of fluorocarbon foaming agents include methyl fluoride, perfluoromethane, ethyl fluoride,), 1,1-difluoroethane (HC-152a), fluoroethane (HFC-161), 1,1,1-trifluoroethane (HFC-143a), 1,1,1,2-tetrafluoroethane (HFC-134a), 1,1,2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane and combinations thereof.

Useful partially halogenated chlorocarbon and chlorofluorocarbon foaming agents include methyl chloride, methylene chloride, ethyl chloride, 1,1,1-trichloroethane, 1,1-dichloro-1-fluoroethane (HCFC-141 b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124) and combinations thereof.

Examples of useful fully halogenated chlorofluorocarbons include trichloromonofluoromethane (CFC-11), dichlorodifluoromethane (CFC-12), trichloro-trifluoroethane (CFC-113), dichlorotetrafluoroethane (CFC-114), chloroheptafluoropropane and dichlorohexafluoropropane and combinations thereof.

The foaming agents may be used as single components, in mixtures and combinations thereof, as well as in mixtures with other co-foaming agents. The foaming agent is added to the composition in an amount sufficient to achieve a desired foam density.

The vehicle may also include a nucleating agent. A nucleating agent can be any conventional nucleating agent. The amount of nucleating agent to be added depends upon the desired cell size, the selected foaming agent and the density of the vehicle. Examples of inorganic nucleating agents in small particulate form include clay, talc, silica, and diatomaceous earth. Organic nucleating agents can decompose or react at a given temperature.

One example of an organic nucleating agent is a combination of an alkali metal salt of a polycarboxylic acid with a carbonate or bicarbonate- Examples of useful alkali metal salts of a polycarboxylic acid include the monosodium salt of 2,3-dihydroxy-butanedioic acid (i.e., sodium hydrogen tartrate), the monopotassium salt of butanedioic acid (i.e., potassium hydrogen succinate), the trisodium and tripotassium salts of 2-hydroxy-1,2,3-propanetricarboxylic acid (i.e., sodium and potassium citrate, respectively), and the disodium salt of ethanedioic acid (i.e., sodium oxalate) and polycarboxylic acid such as 2-hydroxy-1,2,3-propanetricarboxylic acid, and combinations thereof. Examples of carbonate and bicarbonate include sodium carbonate, sodium bicarbonate, potassium bicarbonate, potassium carbonate and calcium carbonate and combinations thereof. One contemplated combination is a monoalkali metal salt of a polycarboxylic acid, such as monosodium citrate or monosodium tartrate, with a carbonate or bicarbonate. It is contemplated that mixtures of different nucleating agents may be added to the vehicle. Other useful nucleating agents include a stoichiometric mixture of citric acid and sodium bicarbonate.

The components of the foam composition can be selected to provide foam compositions suitable for use in a variety of applications. Representative examples of foam applications include adhesives, flotation, applications in the automotive industry including, e.g., automotive body moldings, applications related to automotive glazing including, e.g., gaskets and sealants, applications in the construction industry including, e.g., structural components, e.g., sized lumber, shaped trim, posts, beams and shaped structural members, lightweight ceramics including, e.g., pre-cast and cast-in-place construction materials including, e.g., cementitious and gypsum materials such as blocks, boards, panels, roof-decks and flooring, landfill covers, odor barriers, dust covers, firefighting and fireproofing foams, liquid containment booms (e.g., oil spill containment boom), and fillers for voids such as oil wells and tunnels and voids present in soil. Other foam applications include packaging, commercial cleaning products including, e.g., cleaners for vertical cleaning applications, inks, de-inking compositions, surface coatings including, e.g., foamed coatings for paper and textile treatment.

The foam compositions can also be formulated for use in applications such as foamed personal care products including, e.g., hair treatment compositions, shaving compositions and skin treatment compositions; medical applications including, e.g., bandages and wound dressings; and household and industrial applications including, e.g., cups, plates, earplugs, cushions, pillows, insulation, a damper including, e.g., for suppressing sound, absorbing vibration (including, e.g., cushioning the vibration of machine covers) and combinations thereof, and baffles.

In another embodiment, the foam composition is formulated to be useful as a gasket or seal to seal an area from dust, moisture, organic vapor and combinations thereof. Examples of sealing applications include sealing gaps between parts in computer printers, sealing electronic equipment and sealing skylight assemblies.

The foam composition can be formulated to provide foams that are flexible and conformable and suitable for filling gaps and bonding irregular surfaces. When bonding rough or irregular surfaces, the properties and formulation of the foam tape are preferably further selected to provide a foam tape that distributes stress uniformly over the bonded area. The foam can also be formulated to provide a bond line that seals, cushions vibration, damps vibration, resists impact, withstands a wide temperature range or provides good insulating qualities or provides a combination of these properties.

The foam composition can be in the form of a tape including, e.g., a pressure-sensitive adhesive tape. Useful foam tape constructions include foam composition disposed on a substrate, e.g., a backing or a release liner, and, optionally, wound in the form of a roll. In some embodiments, the foam tape construction includes an adhesive composition disposed on a surface of a foam tape, which forms a tape having an adhesive layer on one side of the foam tape, i.e., a single coated adhesive foam tape. In another embodiment, the foam composition can be in the form of a tape having an adhesive layer on two major surfaces of the foam tape, which is known as double-coated foam tape.

Adhesive foams have a variety of useful applications including, e.g., bonding two substrates together, mounting applications using articles including, e.g., hooks, hangers, and holders, joining applications including, e.g., adhering two or more containers, e.g., boxes, together for later separation, bonding articles to surfaces including, e.g., walls, floors, ceilings and counters and replacing mechanical fasteners, mastics, or liquid glues. Other adhesive foam applications include, e.g., as structural adhesives and foam-in-place adhesives.

In other embodiments, the foam composition includes other components including, e.g., scrims, films, tissues and combinations thereof, dispersed in the foam or disposed in a layered construction with the foam composition in the form of, e.g., alternating layers, interpenetrating layers and combinations thereof. Other useful foam constructions include multi-layer foam constructions that include layers of foam where the layers differ in at least one property including, e.g., density and composition.

The foam composition can also be subjected to post processes including, e.g., die cutting, crosslinking and sterilization.

The invention will now be described further by way of the following examples. All parts, ratios, percents and amounts stated in the Examples are by weight unless otherwise specified.

EXAMPLES

Test Procedures

Test procedures used in the examples include the following.

Determination of L Value

The L value of a sample is determined using a Hunter Lab D25A Optical Sensor calorimeter (Hunter Associates Laboratory, Reston, Va.). The L value is a measure of the lightness or darkness of a sample on a scale of 1–100 (where a value of 1 is black and a value of 100 is white). The sample is placed in the colorimeter and the 'black' control panel used to calibrate the colorimeter is placed behind the sample. The 'L' value is read from the instrument. According to this test method, a relatively higher nitrogen content in the sample will result in relatively more dispersed gas bubbles and correspondingly more light scattering which results in a higher 'L' value.

Preparation of Pentamethyl(2-[tris(2-methoxyethoxy)silyl]ethyl)disiloxane Coupling Agent Pentamethyl(2-[tris(2-methoxyethoxy)silyl]ethyl) disiloxane Coupling Agent ("Silane Coupling Agent A") was prepared by combining 143.86 g tris(2-methoxyethoxy) vinylsilane (Aldrich Chemical Co., Milwaukee, Wis.) and 76.14 g pentamethyldisiloxane (Gelest, Inc., Tullytown, Pa.) with mixing in 145 g heptane. One drop of a platinum(0) divinyltetramethyldisiloxane catalyst (prepared according to the procedures in U.S. Pat. Nos. 3,814,730 and incorporated herein) was added to 0.3 g heptane to form a solution. 0.1 g of this solution was added to the above reaction mixture, which was then allowed to stir in a nitrogen atmosphere, without heating, overnight. The reaction continued until completion as determined by the disappearance of the Si—H peak using infrared spectroscopy (IR). Heptane was removed from the composition by evaporation under reduced pressure to give Silane Coupling Agent A.

Preparation of Silane Coupling Agent A Surface-Modified Silica Nanoparticles

Silica nanoparticles surface modified with Silane Coupling Agent A were prepared as follows: 525 g NALCO 2326 15% by weight solids ammonia stabilized colloidal silica having an average particle size of 5 nm and a surface area of about 600 meters$^2$/gram (as reported by the manufacturer, Nalco Chemical Co., Naperville, Ill.), 83.7 g Silane Coupling Agent A and 1010 g 1-methoxy-2-propanol (Aldrich) were combined with mixing in a 1 gallon glass jar. The jar containing the mixture was sealed, placed in a vented oven, and heated overnight at 80° C. The mixtures was then transferred to an evaporating dish for drying and dried in a flow-through oven at 150° C. to produce 118.8 g of a white particulate solid.

Preparation of Silane Coupling Agent A/Gamma-Methacryloyloxvpropyltrimethoxysilane Surface-Modified Silica Nanoparticles Silica nanoparticles surface modified with Silane Coupling Agent A and gamma-methacryloyl- oxypropyltrimethoxysilane were prepared as follows: 106.93 g Silane Coupling Agent A, 3.25 g SILQUEST A-174 gamma-methacryloyloxypropyltrimethoxysilane (OSi Specialties Inc., Endicott, N.Y.), 1940 g 1-methoxy-2-propanol and 1000 g NALCO 2326 colloidal silica were combined in a 1 gallon glass jar. The jar containing the mixture was sealed. The mixture was then shaken to ensure mixing, placed in an oven and heated overnight at 80° C. The mixture was then dried in a flow through oven at 150° C. to produce a white particulate solid.

Preparation of Isooctylsilane Surface-Modified Silica Nanoparticles

Silica nanoparticles surface modified with isooctyltrimethoxysilane were prepared as follows: 61.42 g BS1316 isooctyltrimethoxysilane (Wacker Silicones Corp., Adrian, Mich.), 1940 g 1-methoxy-2-propanol and 1000 g NALCO 2326 colloidal silica were combined in a 1 gallon glass jar. The mixture was shaken to ensure mixing and then placed in an oven at 80° C. overnight. The mixture was then dried in a flow through oven at 150° C. to produce a white particulate solid.

Preparation of Methoxyethoxyethoxyethoxyureidopropyltriethoxysilane Coupling Agent Methoxyethoxyethoxyethoxyureidopropyltriethoxysilane coupling agent ("Silane Coupling Agent B") was prepared by charging 50.02 g triethyleneglycol monomethyl ether (Aldrich) and 46 g methyl ethyl ketone into a 250 ml round bottom flask equipped with a magnetic stir bar. A majority of the methyl ethyl ketone was removed via rotary evaporation. 76.03 g 3-isocyanatopropyltriethoxysilane (United Chemical Technologies, Bristol, Pa.) and approximately 3 mg dibutyltin dilaurate (Aldrich) were added to the flask and the mixture was stirred. The reaction proceeded with a mild exotherm. The reaction was run for approximately 16 hr, after which time infrared spectroscopy showed a small isocyanate peak. An additional 0.1 g triethyleneglycol monomethyl ether was added to the composition and the remainder of the methyl ethyl ketone was removed via rotary evaporation at reduced pressure and 70° C. to give Silane Coupling Agent B. No observable isocyanate peak was detected using infrared spectroscopy.

Preparation of Silane Coupling Agent B Surface-Modified Silica Nanoparticles

Silane Coupling Agent B surface-modified silica nanoparticles were prepared by charging 200.0 g Nalco 2327 40% by weight solids ammonia stabilized colloidal silica having an average particle size of 20 nm and a surface area of about 150 meters$^2$/gram (as reported by the manufacturer, Nalco Chemical Co.) to a 1 quart glass jar. 226 g deionized water and 8.47 g Silane Coupling Agent B were added to the colloidal dispersion with stirring. The jar was sealed and heated to 80° C. for 18 hours to produce a clear blue tinted colloidal dispersion of 18% by weight Silane Coupling Agent B surface-modified silica nanoparticles in water.

Preparation of Silane Coupling Agent A/Silane Coupling Agent B Modified Silica Nanoparticles in Isooctyl Acrylate/Acrylic Acid (81.5/18.5)

Silane Coupling Agent A/Silane Coupling Agent B surface-modified silica nanoparticles were prepared by charging 400.43 g Nalco 2326 colloidal silica to a 1 quart glass jar. 452.97 g 1-methoxy-2-propanol, 6.43 g Silane Coupling Agent B and 31.40 g Silane Coupling Agent A were mixed together and added to the colloidal silica with stirring. The jar was sealed and heated to 80° C. for 18 hours resulting in a slurry of Silane Coupling Agent A/Silane Coupling Agent B surface-modified silica nanoparticles ("Slurry A").

A 1-liter round-bottom flask was charged with 239.07 g Slurry A and 30.03 g isooctyl acrylate. Water and alcohol were removed from the composition via rotary evaporation at reduced pressure. The flask was removed from the rotary evaporator and an additional 266.56 g Slurry A and 30.17 g isooctyl acrylate were added. The remaining alcohol and water were removed via rotary evaporation at reduced pressure. The flask was again removed from the rotary evaporator and an additional 323.28 g Slurry A and 30.04 g isooctyl acrylate were added. The remaining alcohol and water were removed via rotary evaporation at reduced pressure.

147.03 g of a viscous colloidal dispersion containing approximately 38.4 % silica was obtained. 20.56 g acrylic acid was added to 144 g of the viscous colloidal dispersion and mixed thoroughly.

Example 1

Example 1 was prepared by adding 0.1 g of the colloidal dispersion of 18% by weight Silane Coupling Agent B surface-modified silica nanoparticles in water to 0.9 g deionized water. The sample was then shaken by hand to produce foam. The foam was observed to be stable for greater than 1 minute.

Comparative Example 1

Comparative Example 1 was prepared by shaking 1 g deionized water for the same period of time that Example 1 was shaken. No foam was visible.

Example 2

Example 2 was prepared by adding 0.04 g isooctylsilane surface-modified silica nanoparticles to 1.96 g toluene. The sample was then shaken by hand to produce foam. The foam was observed to be stable for greater than 1 minute.

Comparative Example 2

Comparative Example 2 was prepared by shaking 2 g toluene for the same period of time that Example 2 was shaken. No foam was visible.

Example 3

Example 3 was prepared by adding 0.04 g Silane Coupling Agent A surface modified silica nanoparticles to 1.96 g ethyl acetate. The sample was then shaken to produce foam. The foam was observed to be stable for greater than 1 minute.

Comparative Example 3

Comparative Example 3 was prepared by shaking 2 g ethyl acetate for the same period of time that Example 3 was shaken. No foam was visible

Preparation of Composition A

A syrup was prepared by combining 87.5 parts isooctyl acrylate, 12.5 parts acrylic acid and 0.04 parts IRGACURE 651 2,2-dimethoxy-1,2-diphenylethane-1-one photointiator (Ciba Specialty Chemicals, Tarrytown, N.Y.), and then partially polymerizing the mixture using ultraviolet radiation to provide a syrup having a viscosity of about 3000 cPs. Composition A was prepared by adding an additional 0.19 g IRGACURE 651 and 0.55 g 1,6.-hexanediol diacrylate to the syrup. Thirty grams of Composition A was used for Controls 1–6 and Examples 4–11.

Controls 1–6

Control 1 was Composition A.

Control 1 was foamed by stirring the composition with a fritted glass tube through which nitrogen passed, under low pressure (i.e., less than 2 psi), into the composition. The fritted glass tube was approximately 6 inches in length, included a fritted nozzle end nominally 10 mm in diameter and 16 mm in length, and was attached to a source of nitrogen. The composition was stirred for approximately 2 minutes or until there was no visible sign of additional frothing of the sample.

The foamed sample was then coated between 3 mil thick silicone coated transparent polyethylene terephthalate release liners at a thickness of 40 mils using a notched bar coater, and then cured by immediately placing the coated sample directly beneath a single 15 watt Blacklight F15T8-BL bulb (General Electric Co.) in a two-bulb capacity light fixture (Model XX-15L (UVP San Gabriel, Calif.)) such that the distance from the bulb to the sample was approximately 6.3 mm. The sample was then exposed to the radiation for approximately 3 minutes, which permanently fixed the foam in place.

Control 2 was prepared by combining 98% by weight Composition A and 2% by weight Dow Corning 1250 surfactant (Dow Corning, Midland, Mich.). The sample composition was then foamed and cured as described in Control 1.

Control 3 was prepared by combining 98% by weight Composition A and 2% by weight dried NALCO 2326 silica nanoparticles. The sample composition was then foamed and cured as described in Control 1.

Control 4 was prepared by combining 98% by weight Composition A and 2% by weight AEROSIL R-972 dimethylsilyl-modified fumed silica (Degussa Corp., Ridgefield Park, N.J.). The sample composition was then foamed and cured as described in Control 1.

Control 5 was prepared by combining 98% by weight Composition A and 2% by weight CABOSIL M-5 hydrophobic fumed silica (Cabot Corp., Naperville, Ill.). The sample composition was then foamed and cured as described in Control 1.

Control 6 was prepared by combining 98% by weight Composition A and 2% by weight AEROSIL R805 n-octylsilyl-modified fumed silica (DeGussa). The sample composition was then foamed and cured as described in Control 1.

Examples 4–11

Example 4 was prepared by combining 98% by weight Composition A and 2% by weight isooctylsilane surface-modified silica nanoparticles.

The composition of Example 4 was then foamed by stirring the composition with a fritted glass tube through which nitrogen passed, under low pressure (i.e., less than 2 psi), into the composition. The fritted glass tube was approximately 6 inches in length, included a fritted nozzle end nominally 10 mm in diameter and 16 mm in length, and was attached to a source of nitrogen. The composition was stirred for approximately 2 minutes or until there was no visible sign of additional frothing of the sample.

The foamed sample was then coated between 3 mil thick silicone coated PET release liners at a thickness of 40 mils using a notched bar coater, and then cured by immediately placing the coated sample directly beneath a single 15 watt Blacklight F15T8-BL bulb (General Electric Co.) in a two-bulb capacity light fixture (Model XX-15L (UVP San Gabriel, Calif.)) such that the distance from the bulb to the sample was approximately 6.3 mm. The sample was then exposed to the radiation for approximately 3 minutes, which permanently fixed the foam in place.

Example 5 was prepared by combining 99.7% by weight Composition A and 0.3% by weight Silane Coupling Agent A/gamma-methacryloyloxypropyltrimethoxysilane surface-modified silica nanoparticles. The sample composition was then foamed and cured as described in Example 4.

Example 6 was prepared by combining 99.3% by weight Composition A and 0.7% by weight Silane Coupling Agent A/gamma-methacryloyloxypropyltrimethoxysilane surface-modified silica nanoparticles. The sample composition was then foamed and cured as described in Example 4.

Example 7 was prepared by combining 98.5% by weight Composition A and 1.5% by weight percent of Silane Coupling Agent A/gamma-methacryloyloxypropyltri-methoxysilane surface-modified silica nanoparticles. The sample composition was then foamed and cured as described in Example 4.

Example 8 was prepared by combining 98% weight Composition A and 2% by weight Silane Coupling Agent Algamma-methacryloyloxypropyltrimethoxysilane surface-modified silica nanoparticles. The sample composition was then foamed and cured as described in Example 4.

Example 9 was prepared by combining 98% weight Composition A and 2% by weight of the Silane Coupling Agent A/Silane Coupling Agent B surface-modified silica nanoparticles/isooctyl acrylate/acrylic acid composition. The sample composition was then foamed and cured as described in Example 4.

Example 10 was prepared by combining 98% by weight Composition A and 2% by weight Silane Coupling Agent A surface-modified silica nanoparticles. The sample composition was then foamed and cured as described in Example 4.

Example 11 was prepared by combining 97% by weight Composition A, 2% by weight Silane Coupling Agent A surface-modified silica nanoparticles and 1% by weight Dow Corning 1250 surfactant. The sample composition was then foamed and cured as described in Example 4.

The L values of the foamed and cured samples of Controls 1–6 and Examples 4–11 were determined according to the L Value Test Method. The results are shown in Table 1.

TABLE 1

| Sample | % by weight Composition A | Additive | Surface-Modifier | % by weight surface-modified nanoparticles | 'L' Value Reading |
|---|---|---|---|---|---|
| Control 1 | 100 | None | NA | 0 | 33.6 |
| Control 2 | 98 | 2% by weight Surfactant | NA | 0 | 53.2 |
| Control 3 | 98 | NALCO 2326 silica nanoparticles | NA | 0 | 31.6 |
| Control 4 | 98 | AEROSIL R-972 hydrophobic fumed silica | Dimethydichlorosilane | 0 | 27.3 |
| Control 5 | 98 | CABOSIL M-5 hydrophilic fumed silica | NA | 0 | 33.9 |
| Control 6 | 98 | AEROSIL R-805 hydrophobic fumed silica | n-Octyltrimethoxysilane | 0 | 33.5 |
| Example 4 | 98 | Surface-modified NALCO 2326 colloidal silica | Isooctylsilane | 2 | 53.0 |
| Example 5 | 99.7 | Surface-modified NALCO 2326 colloidal silica | Silane Coupling Agent A/A174 | 0.3 | 51.7 |
| Example 6 | 99.3 | Surface-modified NALCO 2326 colloidal silica | Silane Coupling Agent A/A174 | 0.7 | 57.8 |
| Example 7 | 98.5 | Surface-modified NALCO 2326 colloidal silica | Silane Coupling Agent A/A174 | 1.5 | 61.6 |
| Example 8 | 98 | Surface-modified NALCO 2326 colloidal silica | Silane Coupling Agent A/A174 | 2 | 58.2 |
| Example 9 | 98 | Surface-modified NALCO 2327 colloidal silica | Silane Coupling Agent A/Silane Coupling Agent B | 2 | 54.2 |
| Example 10 | 98 | Surface-modified NALCO 2326 colloidal silica | Silane Coupling Agent A | 2 | 58.8 |
| Example 11 | 97 | Surface-modified NALCO 2326 colloidal silica and 1% surfactant | Silane Coupling Agent A | 2 | 65.9 |

Foaming Thermoplastic Compositions

Control 7–8 and Examples 12–13

Samples were prepared by melting approximately 45 g ENGAGE 8200 thermoplastic polyolefin elastomer having a melting point of 60° C. and a melt flow rate of 5 g/10 min, as determined by ASTM D1238 (DuPont Dow Elastomers, Wilmington, Del.), in a PLASTI-CORDER dual rotor kneader (C. W. Brabender Instruments, South Hackensack, N.J.). Once the samples were melted, 2% by weight CELO-GEN 754-A blowing agent (Uniroyal Chemical Co.) was blended into the polymer melt. For compositions that included nanoparticles, 2% by weight nanoparticles (of the type specified in Table 2) was added to the polymer mixture after the blowing agent was fully blended into the polymer. The mixture was then removed from the kneader.

The polymer mixture was then placed between two polyester films and flattened in a hydraulic press (heated on top and bottom to about 135° C.) to a thickness between about 0.1 mm and 1.3 mm.

The sample was then cut into approximately 1 in.×1 in. pieces. The thickness of each sample was measured using a caliper gauge. The samples were then placed in an oven at about 180° C. to activate the blowing agent and foam the samples. The foamed samples were then removed from the oven after 2, 5, 10 or 15 minutes and cooled to room temperature. The sample thickness was again measured using a caliper gauge. The average percent growth in thickness was calculated for each time interval. A higher percent growth indicates more foaming. The results are reported in Table 2.

TABLE 2

| Sample | Silica Particles and Surface Treatment | Average Percent Increase in Foam Thickness | | | |
|---|---|---|---|---|---|
| | | 2 min | 5 min | 10 min | 15 min |
| Control 7 | No particles | 49.9 | 102.3 | 122.0 | 159.7 |
| Control 8 | Dried NALCO 2326 silica nanoparticles | 58.4 | 148.4 | 149.4 | 191.6 |
| Example 12 | Isooctyltrimethoxysilane surface-modified silica nanoparticles | 63.8 | 160.5 | 196.4 | 229.6 |
| Example 13 | Silane Coupling Agent A surface-modified silica nanoparticles | 63.1 | 156.7 | 192.5 | 208.4 |

Other embodiments are within the claims.

What is claimed is:

1. A foam composition comprising:
   a vehicle; and
   surface-modified nanoparticles disposed in said vehicle, said individual nanoparticles having a particle diameter of less than about 100 nanometers.

2. The foam composition of claim 1, wherein said foam is essentially free of surfactant.

3. The foam composition of claim 1, further comprising surfactant.

4. The foam composition of claim 1, wherein said surface-modified nanoparticles comprise at least about 0.5% by weight of said composition.

5. The foam composition of claim 1, wherein said surface-modified nanoparticles comprise at least about 1% by weight of said composition.

6. The foam composition of claim 1, wherein said surface-modified nanoparticles comprise at least about 2% by weight of said composition.

7. The foam composition of claim 1, wherein said surface-modified nanoparticles comprise at least about 5% by weight of said composition.

8. The foam composition of claim 1, wherein said surface-modified nanoparticles comprise at least about 10% by weight of said composition.

9. The foam composition of claim 1, wherein said individual nanoparticles have a particle diameter no greater than about 50 nanometers.

10. The foam composition of claim 1, wherein said individual nanoparticles have a particle diameter in the range of from about 3 nanometers to about 50 nanometers.

11. The foam composition of claim 1, wherein said individual nanoparticles have a particle diameter of no greater than about 20 nanometers.

12. The foam composition of claim 1, wherein said individual nanoparticles have a particle diameter in the range of from about 3 nanometers to about 20 nanometers.

13. The foam composition of claim 1, wherein said individual nanoparticles have a particle diameter in the range of from about 3 nanometers to about 10 nanometers.

14. The foam composition of claim 1, wherein said nanoparticles are selected from the group consisting of silica, titania, alumina, zirconia, vanadia, ceria, iron oxide, antimony oxide, tin oxide, aluminum/silica and combinations thereof.

15. The foam composition of claim 1, wherein said nanoparticles comprise surface groups selected from the group consisting of hydrophobic groups, hydrophilic groups and combinations thereof.

16. The foam composition of claim 1, wherein said nanoparticles comprise surface groups derived from an agent selected from the group consisting of silane, organic acid, organic base and combinations thereof.

17. The foam composition of claim 1, wherein said nanoparticles comprise organosilyl surface groups derived from an agent selected from the group consisting of alkylsilane, arylsilane, alkoxysilane and combinations thereof.

18. The foam composition of claim 1, wherein said nanoparticles comprise surface groups derived from an agent selected from the group consisting of carboxylic acids, sulfonic acids, phosphonic acids and combinations thereof.

19. The foam composition of claim 1, wherein said vehicle comprises monomer, oligomer or polymer or a combination thereof.

20. The foam composition of claim 1, wherein said vehicle comprises a polymer selected from the group consisting of thermoplastic polymer, thermoset polymer, elastomer and mixtures thereof.

21. The foam composition of claim 1, wherein said vehicle comprises a polymer is selected from the group consisting of natural rubber, synthetic rubber, acrylonitrile-butadiene rubber, polyisoprene rubber, polychloroprene rubber, polybutadiene rubber, butyl rubber, ethylene-propylene-diene monomer rubber, ethylene-propylene rubber, styrene-butadiene copolymer, styrene-isoprene copolymer, styrene-butadiene-styrene rubber, styrene-isoprene-styrene rubber, styrene-ethylene-butylene-styrene rubber, styrene-ethylene-propylene-styrene rubber, polyisobutylene rubber, ethylene-vinyl acetate rubber, silicone rubber, polyvinyl ethers and combinations thereof.

22. The foam composition of claim 1, wherein said vehicle comprises a polymer selected from the group consisting of polyester, polyurethane, amino resin, alkyd resin, phenolic resin, epoxy resin, isocyanate resin, isocyanurate resin, polysiloxane resin and mixtures thereof.

23. The foam composition of claim 1, wherein said vehicle comprises a polymer selected from the group consisting of polyacrylonitrile, acrylonitrile-butadiene-styrene, styrene-acrylonitrile, cellulosic polymers, chlorinated polyether, ethylene vinyl acetate copolymers, polyamides, polyimides, polycarbonates, polyolefins, polyethylene terephthalate, polyphenylene oxide, polystyrene, polyurethane, polyisocyanurates, polyvinyl chloride, polyvinyl acetate, polyvinyl alcohol, polyvinyl butyral, polyvinyl pyrrolidone, polyvinylidene chloride and mixtures thereof.

24. The foam composition of claim 1, wherein said vehicle comprises acrylic resin.

25. The foam composition of claim 19, wherein said acrylic resin comprises acrylic or methacrylic acid ester of a monohydric alcohol having from 1 to 20 carbon atoms.

26. The foam composition of claim 1, wherein said vehicle is nonpolymerizable.

27. The foam composition of claim 1, wherein said vehicle is essentially free of polymer.

28. The foam composition of claim 1, wherein said vehicle comprises polyolefin.

29. The foam composition of claim 1, wherein said vehicle comprises metallocene polymerized polyolefin.

30. The foam composition of claim 1, wherein said vehicle comprises resin selected from the group consisting of novolac resin, resole resin and polyurea resin and mixtures thereof.

31. The foam composition of claim 1, wherein said vehicle comprises isooctyl acrylate and acrylic acid.

32. The foam composition of claim 1, wherein said vehicle is selected from the group consisting of water, alcohols, aldehydes, ketones, esters, ethers, amines, amides, hydrocarbons, halocarbons and mixtures thereof.

33. The foam composition of claim 1, further comprising a foaming agent.

34. The foam composition of claim 1, wherein said surface-modified nanoparticles comprise statistically averaged randomly surface-modified nanoparticles.

35. The foam composition of claim 1, wherein said surface-modified nanoparticles comprise surface groups having a solubility parameter similar to the solubility parameter of said vehicle.

36. The foam composition of claim 1, wherein said surface-modified nanoparticles appear to be dissolved in said vehicle.

37. The foam composition of claim 1 wherein said vehicle comprises an adhesive composition.

38. The foam composition of claim 1 wherein said vehicle comprises a pressure sensitive adhesive composition.

39. The foam composition of claim 38, wherein said pressure sensitive adhesive composition comprises acrylic resin.

40. The foam composition of claim 39, wherein said acrylic resin comprises acrylic or methacrylic acid ester of a monohydric alcohol having from 1 to 20 carbon atoms.

41. The foam composition of claim 38 wherein said vehicle comprises isooctyl acrylate and acrylic acid copolymer.

42. The foam composition of claim 1, wherein said vehicle comprises a hot melt adhesive composition.

43. An adhesive tape comprising the foam composition of claim 1.

44. The adhesive tape of claim 43, further comprising a substrate, said foam composition being disposed on said substrate.

45. A pressure sensitive adhesive tape comprising the foam composition of claim 1.

46. The pressure sensitive adhesive tape of claim 45, wherein said foam composition comprises acrylic resin.

47. The pressure sensitive adhesive tape of claim 46, wherein said acrylic resin comprises acrylic or methacrylic acid ester of a monohydric alcohol having from 1 to 20 carbon atoms.

48. The pressure sensitive adhesive tape of claim 46 wherein said vehicle comprises isooctyl acrylate and acrylic acid copolymer.

49. The pressure sensitive adhesive tape of claim 45, further comprising a substrate, said foam composition being disposed on said substrate.

50. An article comprising the foam composition of claim 1.

51. A gasket comprising the foam composition of claim 1.

52. An automobile body molding comprising the foam composition of claim 1.

53. A method of making a foam composition, said method comprising introducing a foaming agent into a composition in an amount sufficient to form voids in said composition, said composition comprising a vehicle and surface-modified nanoparticles disposed in said vehicle, said surface-modified nanoparticles having a particle diameter of no greater than about 100 nanometers.

54. The method of claim 53, wherein said step of introducing a foaming agent comprises stirring said composition.

55. The method of claim 53, wherein said step of introducing a foaming agent comprises a chemical reaction of at least one component of the composition.

56. The method of claim 53, wherein said foaming agent is selected from the group consisting of liquid, gas and solid foaming agents.

57. The method of claim 53, wherein said foaming agent comprises a gas selected from the group consisting of air, nitrogen, oxygen, carbon dioxide, helium, argon, nitrous oxide, and mixtures thereof.

58. The method of claim 54, wherein said foaming agent comprises a degradation product of a component of the composition.

59. A method of making a tape, said method comprising:
    substantially simultaneously
    a) foaming a composition comprising
        a vehicle, and
        a plurality of surface-modified nanoparticles having an particle diameter of less than about 100 nanometers; and
    b) coating said composition on a substrate.

60. A method of determining compatibility of a predetermined vehicle and surface-modified nanoparticles, said method comprising:
    a) selecting surface-modified nanoparticles having a particle diameter of less than about 100 nanometers;
    b) combining said surface-modified nanoparticles and said vehicle to form a composition; and
    c) introducing a foaming agent into said composition,
    wherein if said composition forms a persistent foam, said surface-modified nanoparticles are compatible with said vehicle.

61. A method of determining compatibility of a predetermined vehicle and surface-modified nanoparticles, said method comprising:
    a) selecting surface-modified nanoparticles having a particle diameter of less than about 100 nanometers: and
    b) combining said surface-modified nanoparticles and said vehicle to form a composition,
    wherein, if said surface-modified nanoparticles appear to dissolve in said vehicle, said surface-modified nanoparticles are compatible with said vehicle.

62. A method for selecting compatible surface-modified nanoparticles for a predetermined vehicle, said method comprising selecting surface-modified nanoparticles having a particle diameter of less than about 100, nanometers and comprising attached surface groups, said surface groups having a solubility parameter substantially similar to the solubility parameter of the predetermined vehicle;

dispersing said surface-modified nanoparticles in a vehicle; and foaming said vehicle, wherein the presence of a persistent foam indicates that the surface-modified nanoparticles are compatible with the vehicle.

63. A method of foaming a composition comprising a) adding surface-modified nanoparticles identified by the method of claim 62 to the predetermined vehicle of claim 62; and b) foaming the vehicle.

* * * * *

UNITED STATES PATENT AND TRADEMARK OFFICE
CERTIFICATE OF CORRECTION

PATENT NO.        : 6,586,483 B2
APPLICATION NO.   : 09/756422
DATED             : July 1, 2003
INVENTOR(S)       : Brant U. Kolb It is certified that error appears in the above-identified patent and that said Letters Patent is hereby corrected as shown below:

Title Page, Item (56)
OTHER PUBLICATIONS, Line12, delete "surfactants" and insert -- Surfactants --, therefor.
OTHER PUBLICATIONS, Line 25, delete "application" and insert -- Application --, therefor.

Column 7
Line 11, after "thereof", insert -- . --.

Column 8
Line 12, delete "nanoparticdes" and insert -- nanoparticles --, therefor.
Line 42, after "about", delete ",".

Column 9
Line 29, delete "polytetrafluoroeythylene" and insert -- polytetrafluoroethylene --, therefor.

Column 10
Line 13, delete "Useflul" and insert -- Useful --, therefor.
Line 24, after "thereof", insert -- . --.

Column 12
Line 31, after "thereof", insert -- . --.
Line 35, after "thereof", insert -- . --.
Line 37, after "thereof", insert -- . --.
Line 43, delete "(HC-152a)" and insert -- (HFC-152a) --, therefor.

Column 13
Line 14, delete "-" and insert -- . --, therefor.

Column 14
Line 66, delete "calorimeter" and insert -- colorimeter --, therefor.

Column 15
Line 48, delete "Methacryloyloxvpropyltrimethoxysilane" and insert -- Methacryloyloxypropyltrimethoxysilane --, therefor.

Column 17
Line 56 (APPROXIMATELY), delete "1,6." and insert --1.6--, therefor.

UNITED STATES PATENT AND TRADEMARK OFFICE
CERTIFICATE OF CORRECTION

PATENT NO.       : 6,586,483 B2
APPLICATION NO.  : 09/756422
DATED            : July 1, 2003
INVENTOR(S)      : Brant U. Kolb It is certified that error appears in the above-identified patent and that said Letters Patent is hereby corrected as shown below:

Column 19
Line 59, delete "Algamma" and insert -- A/gamma --, therefor.

Column 25
Line 5, in Claim 62, after "100" delete ",".

Signed and Sealed this

Twenty-fourth Day of October, 2006

JON W. DUDAS
*Director of the United States Patent and Trademark Office*